Figure 1:
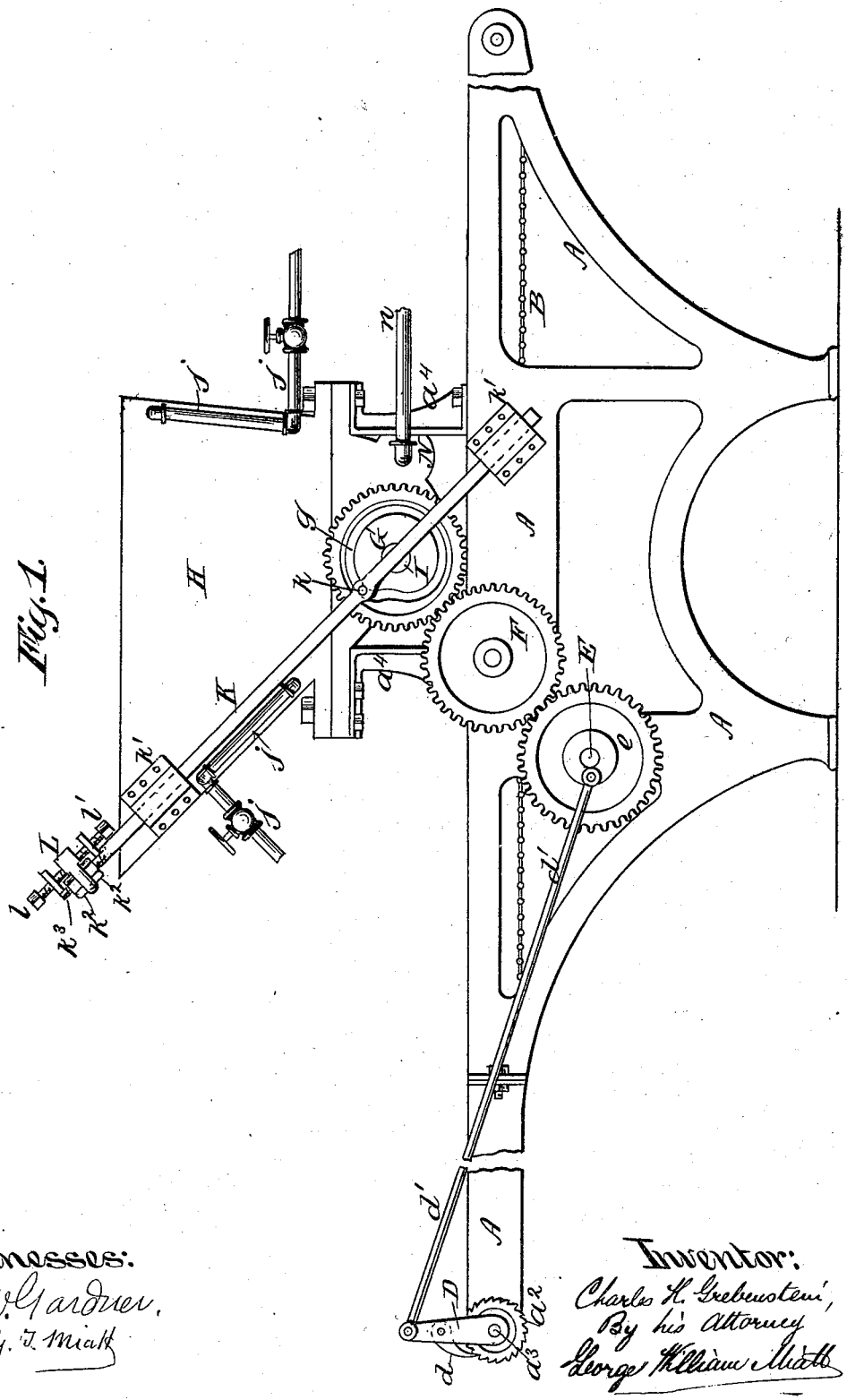

(No Model.) 5 Sheets—Sheet 1.
C. H. GREBENSTEIN.
MACHINE FOR MOLDING CONFECTIONS.

No. 504,449. Patented Sept. 5, 1893.

Witnesses:
D. W. Gardner.
G. T. Miatt

Inventor:
Charles H. Grebenstein,
By his Attorney
George William Miatt (No Model.)  
5 Sheets—Sheet 2.
C. H. GREBENSTEIN.
MACHINE FOR MOLDING CONFECTIONS.
No. 504,449. Patented Sept. 5, 1893.
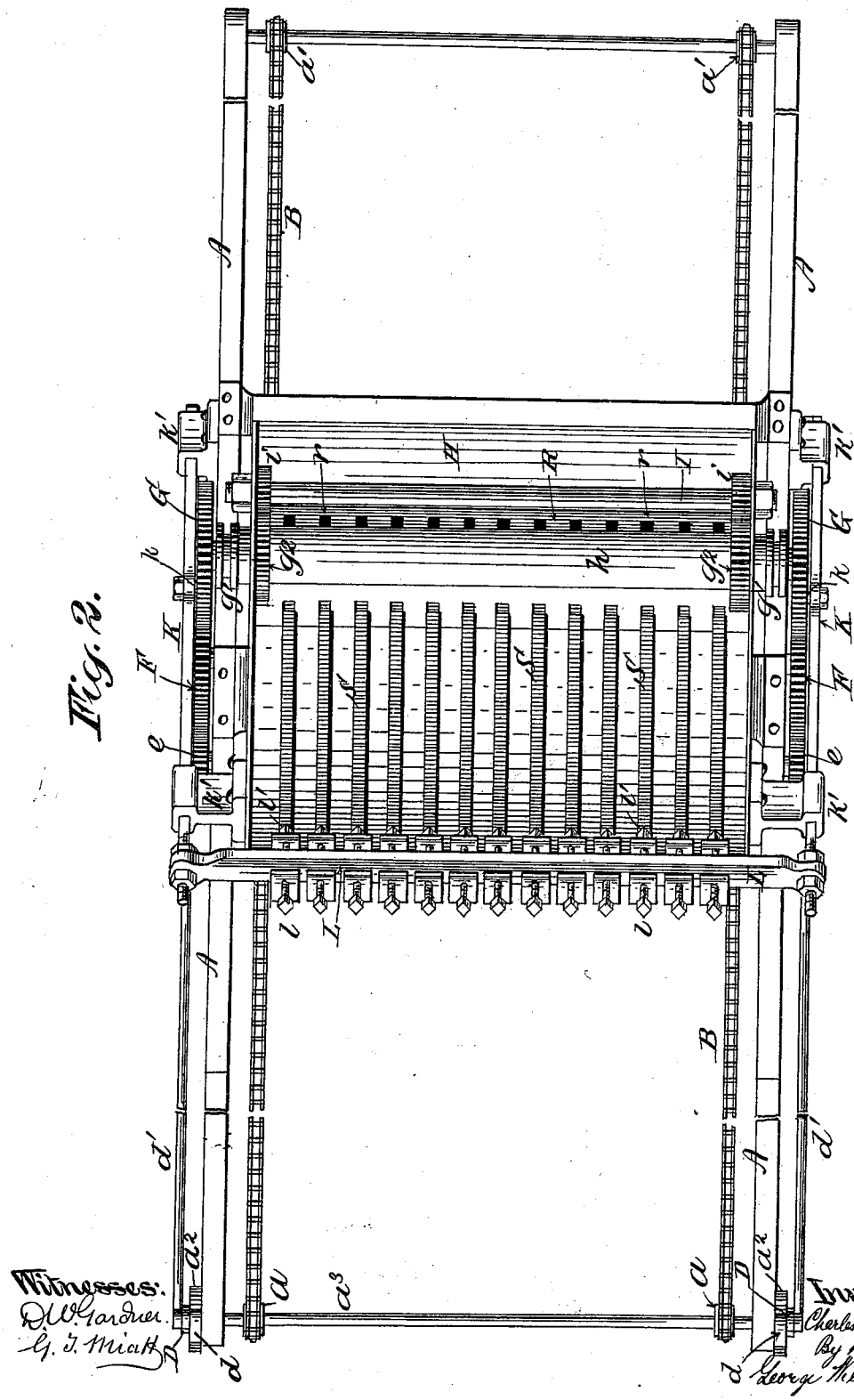

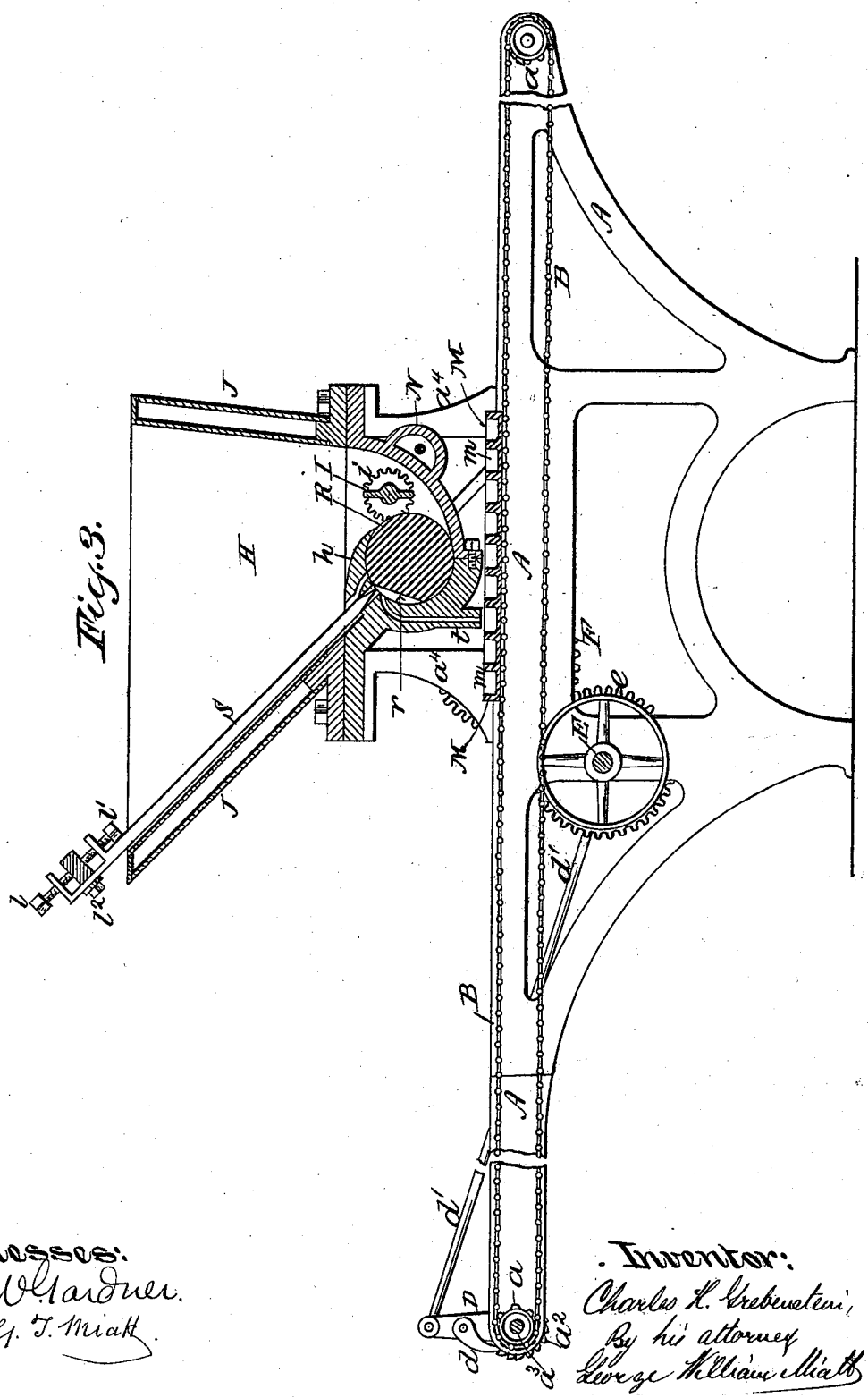

(No Model.)
C. H. GREBENSTEIN.
MACHINE FOR MOLDING CONFECTIONS.
No. 504,449. Patented Sept. 5, 1893.
5 Sheets—Sheet 4.
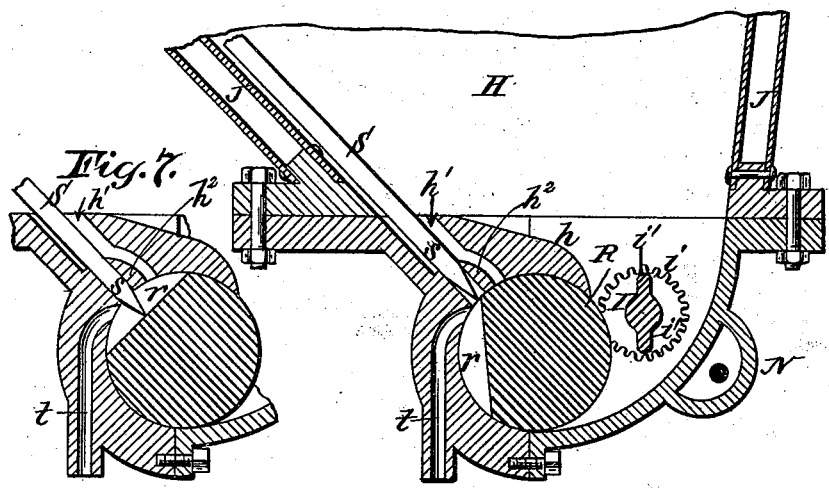
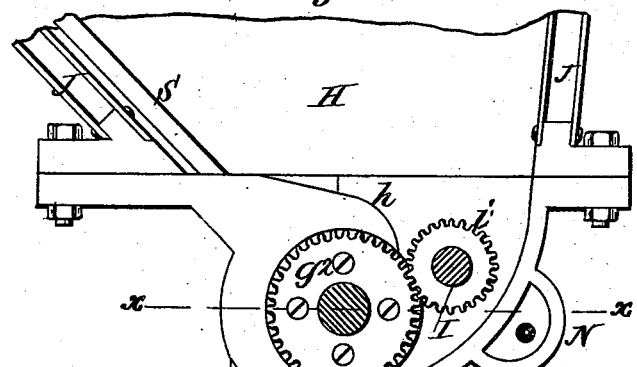
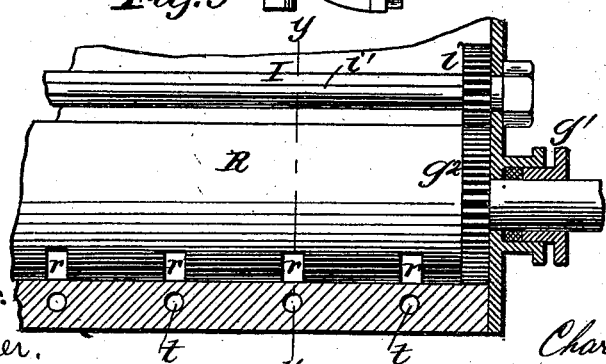
Witnesses:
R. W. Gardner.
G. J. Miatt.
Inventor:
Charles H. Grebenstein,
By his Attorney
George William Miatt (No Model.)
C. H. GREBENSTEIN.
MACHINE FOR MOLDING CONFECTIONS.
No. 504,449. Patented Sept. 5, 1893.
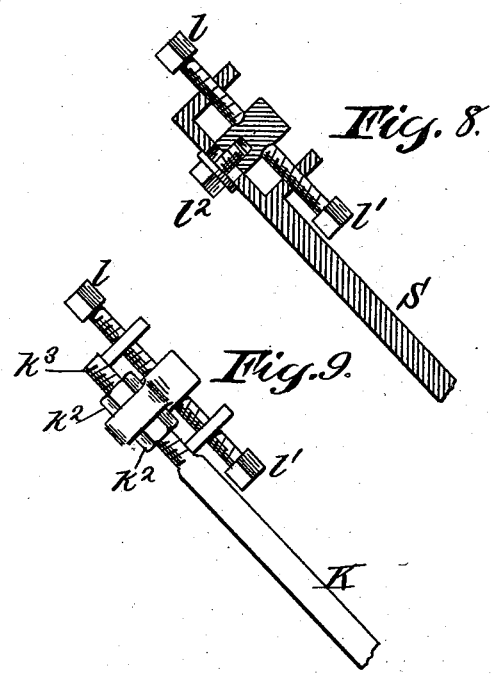
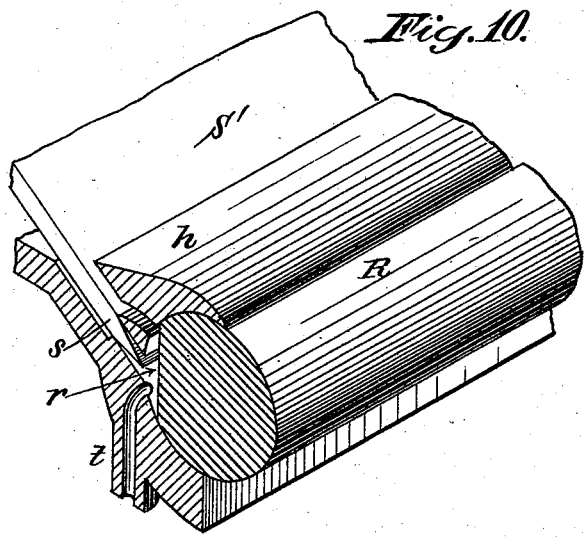
Witnesses:
D. W. Gardner.
G. T. Miatt
Inventor:
Charles H. Grebenstein
By his Attorney
George William Miatt

UNITED STATES PATENT OFFICE.

CHARLES H. GREBENSTEIN, OF NEW YORK, N. Y.

MACHINE FOR MOLDING CONFECTIONS.

SPECIFICATION forming part of Letters Patent No. 504,449, dated September 5, 1893.

Application filed April 19, 1893. Serial No. 470,942. (No model.)

*To all whom it may concern:*

Be it known that I, CHARLES H. GREBENSTEIN, a citizen of the United States, residing in the city, county, and State of New York, have invented certain new and useful Improvements in Machines for Molding Confections, of which the following is a specification sufficient to enable others skilled in the art to which the invention appertains to make and use the same.

My improvements relate to the class of apparatus in which the prepared confection, in a more or less fluid or semi-fluid condition, is dropped intermittently from a hopper into a series of molds which are caused to pass underneath and are stopped intermittently to present fresh molds to receive the material as discharged from the hopper.

Heretofore much difficulty has been experienced in getting these machines to run continuously and smoothly owing to the delicacy of the apparatus resorted to, the stickiness of the material under treatment, and the rapidity with which it cools or sets.

The object of my invention is to overcome these difficulties by the construction of a comparatively simple, inexpensive and effective apparatus which is not liable to become deranged or clogged, and in which the quantity of the confection to be detached and dropped into the molds may be varied and regulated with accuracy, either by adjusting the separators collectively or separately.

The invention relates mainly to the means employed for separating or cutting off and discharging the material from the hopper, the essential feature of novelty being the use of a rotating valve chamber or pocket which takes up a quantity of the confection and presents it to a reciprocating scraper by which a prescribed quantity of the material is positively removed from the rotating valve chamber or pocket and discharged through a suitable drop tube.

Incidentally my invention includes means for adjusting the thrust of the reciprocating scraper with relation to the rotating valve chamber or pocket in such manner as to regulate with accuracy the amount of material discharged; and in the means employed to effect a circulation of the semi-fluid material under treatment through the parts within the hopper for the purpose of preventing the chilling of the said parts and the "caking" of the material.

It is to be understood that the word "valve" is used herein in a broad sense as a means for controlling the flow of the semi-fluid material; and that the term "rotary valve" covers any device formed and revolving in such manner as to alternately open and close the discharge or drop passage while admitting the action of the scraper in positively deflecting into said drop passage any portion of the material contained in the valve chamber or pocket.

In the accompanying drawings I illustrate the practical embodiment of my invention in a machine suitable for use in the manufacture of confectionery, although I do not wish to confine myself to the identical form and construction of parts shown since various modifications may be made in the details of construction without departing from the spirit and intent of my invention.

Figure 1, is a side elevation of a machine designed for use in the manufacture of "set" or molded candies; Fig. 2, a top view of the same; Fig. 3, a central vertical longitudinal section thereof. Fig. 4, is an end elevation of a portion of the hopper, with its end plate removed. Fig. 5, is a sectional view of part of the hopper, &c., upon plane of line $x, x$, Fig. 4, showing the rotating valve cylinder and the agitator, &c., in elevation. Fig. 6, is a sectional view of the lower part of the hopper, upon plane of line $y, y$, Fig. 5. Fig. 7, is a detail section similar to Fig. 6, showing the scraper in the valve chamber or pocket; Fig. 8, a sectional detail showing means for adjusting the scrapers individually; Fig. 9, an elevation of the upper end of one of the guide rods and the end of the cross head, showing means for adjusting the scrapers collectively. Fig. 10, is an isometrical view of the rotating cylinder and adjoining parts in vertical cross section, illustrating the use of a rotating cylinder formed with a single longitudinal pocket in conjunction with a single broad scraper.

A, is the frame-work of the apparatus. An endless chain or belt B, is supported between sprocket wheels $a, a'$, mounted at opposite ends of the frame, and constitutes an intermittently moving table for the support of the molds M, which are placed loosely thereon at one side of the hopper and removed therefrom after passing thereunder. The intermittent forward movement of the endless chain or belt B, may be effected in any well known or suitable manner, the means shown in the drawings consisting of ratchet wheels $a^2, a^2$, upon opposite ends of the same shaft as the sprocket wheels $a, a'$, which are rotated by pawls $d, d$, upon the crank levers D, D, said crank levers D, D, being rocked upon the shaft $a^3$, of the sprocket and ratchet wheels $a, a^2$, by the connection rods $d', d'$, the opposite ends of which are pivoted to the wheels $e$, in such positions that at each rotation of the said wheels the pawls $d, d$, move the ratchet wheels $a^2, a^2$, around a distance equivalent to the distance between the centers of the matrices $m$, in the mat or mold M, thus bringing a fresh set of matrices $m$, under the drop tubes $t$, depending from the lower side of the hopper H. There are two wheels $e, e$, situated upon opposite ends of the power shaft E, and they mesh into intermediate idler gears F, F, on either side of the machine which transmit motion to the spur gears G, G, secured to the opposite ends of the rotating valve cylinder R. The gears $e$, F, and G, are all of the same diameter.

In the outer faces of the gears G, G, is formed the cam groove $g, g$, in which rest the cam pins $k, k$, projecting from the inner sides of the guide rods K, K. These rods K, K, are held and guided by the boxes or straps $k', k'$, and are connected at top by a cross bar or head L, carrying the gang of scrapers S.

The hopper H, is supported above the endless chain B, by standards $a^4, a^4$. It is provided with hot water or steam jackets J, J, supplied through the pipes $j, j$, for the purpose of keeping the contents of the hopper at the right consistency for working.

The rotating valves may be made in various ways, the essential feature being one or more valve chambers or pockets $r$, formed in a rotating part preferably of circular form in cross section, so as to receive, confine and carry around to the reciprocating scraper or scrapers a suitable quantity of the material. The width of a valve chamber or pocket $r, r$, and of the entering ends $s, s$, of the scrapers S, may be varied to suit the requirements of the work to be done,—or instead of a series of valve chambers or pockets $r$, a single one may be used extending in front of the series of drop conduits $t$, and a single broad scraper S', may be used in conjunction therewith as indicated in Fig. 10.

While as above indicated the actual contruction of the rotating valve or valves is of secondary importance and one or a series of separately constructed valves may be combined and used, I prefer for simplicity of construction to use the long cylindrical bar or shaft R, formed with a series of pockets or valve chambers $r$, as shown in the drawings, more especially in Figs. 4, 5, 6 and 7. The valve cylinder R, is rotated by reason of the meshing of its end gears G, G, outside of the stuffing boxes $g', g'$, with the intermediate gears F. Inside the hopper, and adjoining the boxes $g', g'$, the cylinder is provided with gears $g^2, g^2$, which engage with pinions $i, i$, upon the agitator shaft I, which latter is simply formed with blades or projections $i', i'$, which stir up the material in a direction opposite to that of the rotation of the valve cylinder R. The agitator I, is situated at the receiving side of the valve cylinder R, and between the latter and an auxiliary steam or hot water jacket N, supplied by a pipe $n$,— the agitator I, and the heating jacket N, acting in conjunction with each other to insure a proper consistency in the semi-fluid material as received by the valve cylinder. More or less of the circumference of the valve cylinder R, is inclosed as will be seen by reference to Figs. 4, 6 and 7, so that the material received into each valve chamber or pocket $r$, is confined therein until the discharge conduit $t$, is reached and the end $s$, of the scraper S, enters and forces more or less of the material out. This it does by simply protruding into the pocket or valve chamber and acting as an abutment against which the material is forced by the continued rotation of the valve cylinder R, the result being that an amount of material is deflected into the drop conduits $t$, corresponding to the extent of the projection of the scraper ends $s$, into the valve chamber or pocket $r$.

In Fig. 6, the scraper S, is shown as upon the point of entering the pocket $r$; in Fig. 7, it is shown as having entered to the fullest extent possible and at a point of the revolution of the valve cylinder just prior to its retractile movement.

It is obvious that by regulating the extent to which the end $s$, of the scraper projects into the valve chamber or pocket $r$, the quantity removed from the said chamber or pocket may be controlled. When the scraper does not penetrate to the full depth of the valve chamber or pocket a portion of the material remains and is carried around with the cylinder.

When more than one valve chamber or pocket and scraper are employed the scrapers are suspended adjustably upon the cross head L, secured to the guide rods K, K.

Suitable means are provided for effecting the adjustment of the scrapers with relation to the rotary valve cylinder R, and I do not confine myself to any special construction in this respect. As shown in the drawings, the gang of scrapers S, may be adjusted simultaneously by regulating the position of the cross head L, upon the upper ends of the guide bars K, by means of the nuts $k^2, k^2$, upon the male screws $k^3, k^3$, cut upon said upper ends of the guide rods. The adjustment of the scrapers individually is effected by means of set screws 1, 11, 12, by which the upper end of each scraper S, is clamped to the cross bar L. The cam groove $g$, is so formed and timed with relation to the valve chambers or pockets $r$, as to project the points $s$, of the scrapers S, into the said chambers or pockets and to withdraw them therefrom at the proper time; and the forwarding action of the pawl $d$, is timed to take place after the valve chambers or pockets have passed beyond the drop conduits and scrapers.

In order to enable the semi-fluid material to circulate through the internal parts of the apparatus, I form in the hood $h$, when used, passages $h'$, beyond the bearings $h^2$, in which latter the lower ends $s$, of the scrapers S, play and are supported. These passages $h'$, admit the semi-fluid material from above into the valve chambers or pockets to replace in whole or in part that removed by the scraper, thereby causing a circulation of the semi-fluid material through the parts which tends to prevent the chilling of the parts and the caking or "setting" of the material,—the agitator I, with the heating jacket N, insuring the proper admixture and reduction of the material before it is carried to the drop conduits and scrapers.

What I claim as my invention, and desire to secure by Letters Patent, is—

1. In confection molding apparatus, the combination with the hopper and mold, of a rotating cylinder in the hopper formed with one or more valve chambers; one or more reciprocating scrapers acting in conjunction with said valve chamber or chambers; and one or more conduits arranged to receive the material removed from the said valve chamber or chambers by the scraper or scrapers and to drop the said material into the mold below substantially in the manner and for the purpose described.

2. In confection molding apparatus, the combination with the hopper and mold, of a rotating valve in the hopper, a reciprocating scraper acting in conjunction therewith, a conduit for receiving the material removed from the rotating valve by the scraper and dropping it into the mold, and means for adjusting the thrust of the said reciprocating scraper with relation to the rotating valve substantially in the manner described.

3. In confection molding apparatus, the combination with the hopper and mold, of a rotating valve in the hopper, a reciprocating scraper acting in conjunction therewith, a conduit for receiving the material removed from the rotating valve by the scraper and dropping it into the mold, and a rotating agitator situated in the hopper adjoining the receiving side of the rotating valve for the purpose and substantially in the manner described.

4. In confection molding apparatus, the combination with the hopper and mold, of a rotating valve in the hopper, a reciprocating scraper acting in conjunction therewith, a conduit for receiving the material removed from the rotating valve by the scraper and dropping it into the mold, and an auxiliary steam or hot water jacket situated opposite the receiving side of the rotating valve for the purpose and substantially in the manner described.

5. In confection molding apparatus, the combination with the hopper and mold, of a rotating valve in the hopper, a reciprocating scraper acting in conjunction therewith, a conduit for receiving the material removed from the rotating valve by the scraper and dropping it into the mold, a rotary agitator, and an auxiliary steam or hot water jacket situated opposite the receiving side of the rotating valve for the purpose and substantially in the manner described.

6. In confection molding apparatus, the combination with the hopper and mold, of a rotating valve in the hopper a reciprocating scraper acting in conjunction therewith, a conduit for receiving the material removed from the rotating valve by the scraper and dropping it into the mold, and a conduit for admitting material to the valve chamber beyond the scraper for the purpose and substantially in the manner described.

7. In confection molding apparatus, the combination with the hopper and mold, of a rotating cylinder in the hopper formed with a series of valve chambers or pockets, a series of reciprocating scrapers acting in conjunction with said valve chambers, a series of conduits arranged to receive the material removed from the valve chambers by the scrapers and drop the same into the mold below, and means for adjusting the thrust of the scrapers both individually and collectively with relation to the said valve chambers in the rotating cylinder substantially in the manner and for the purpose described.

CHARLES H. GREBENSTEIN.

Witnesses:
W. E. COLEMAN,
D. W. GARDNER.